(12) United States Patent
Franks

(10) Patent No.: US 6,418,852 B2
(45) Date of Patent: *Jul. 16, 2002

(54) VEGETABLE OIL-BASED PRINTING INK AND METHOD FOR PRODUCING SAME

(75) Inventor: William A. Franks, Langston, OK (US)

(73) Assignee: Franks Research Labs, Inc., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/754,816

(22) Filed: Jan. 4, 2001

Related U.S. Application Data

(63) Continuation of application No. 09/456,009, filed on Dec. 7, 1999, now Pat. No. 6,265,594, which is a continuation of application No. 09/128,840, filed on Aug. 4, 1998, now abandoned, which is a continuation of application No. 08/711,577, filed on Sep. 10, 1996, now Pat. No. 5,788,752.

(51) Int. Cl.7 .......................... C08D 11/00; B41F 31/00
(52) U.S. Cl. ................. 101/491; 106/31.34; 106/31.66; 106/14.22; 554/25
(58) Field of Search ....................... 101/491; 106/14.22, 106/31.34, 31.66; 554/25

(56) References Cited

U.S. PATENT DOCUMENTS

| | | | |
|---|---|---|---|
| 4,110,118 A | * | 8/1978 | Salvat Dalmau et al. ..... 106/25 |
| 4,818,284 A | | 4/1989 | McKelvey |
| 5,122,188 A | | 6/1992 | Erhan et al. |
| 5,178,672 A | | 1/1993 | Miller |
| 5,194,173 A | * | 3/1993 | Folkard et al. ............. 252/170 |
| 5,213,044 A | * | 5/1993 | Elia et al. .................... 101/483 |
| 5,308,390 A | | 5/1994 | Pennaz |
| 5,338,344 A | * | 8/1994 | Bondurant ....................... 106/2 |
| 5,338,351 A | | 8/1994 | Pennaz |
| 5,552,467 A | * | 9/1996 | Reiter et al. ................. 524/270 |
| 5,788,752 A | * | 8/1998 | Franks ..................... 106/31.34 |
| RE36,144 E | * | 3/1999 | Spiegel ..................... 101/350.2 |

OTHER PUBLICATIONS

Morrison and Boyd, Organic Chemistry, 5th Ed., p. 1271.
Vegetable Oil–Based News Printing Ink Developed by Continuous Polymerization Reaction, Huang, School of Chemical Engineering, Oklahoma State University, Stillwater, OK, May 1994.

* cited by examiner

Primary Examiner—Eugene Eickholt
(74) Attorney, Agent, or Firm—Dunlap, Codding & Rogers, P.C.

(57) ABSTRACT

Vegetable oil-based printing inks having at least about 20 poises are formulated by admixing a vegetable oil-based printing ink vehicle having an effective amount of polymerized vegetable oil and an effective amount of unpolymerized vegetable oil sufficient to provide the vegetable oil-based printing ink with a viscosity of at least about 20 poises, and an effective amount of colorant to provide the vegetable oil-based printing ink with a predetermined color. Methods for reclaiming residual vegetable oil-based printing ink from a printing press and polymerizing the vegetable oil component of the vegetable oil-based printing ink vehicle are also disclosed.

1 Claim, 1 Drawing Sheet

VEGETABLE OIL-BASED PRINTING INK AND METHOD FOR PRODUCING SAME

CROSS-REFERENCE TO RELATED APPLICATIONS

This application is a continuation of U.S. Ser. No. 09/456,009, filed Dec. 7, 1999, entilted "VEGETABLE OIL-BASED PRINTING INK AND METHOD FOR PRODUCING SAME," now U.S. Pat. No. 6,265,594; which is a continuation of U.S. Ser. No. 09/128,840, filed Aug. 4, 1998, entitled "VEGETABLE OIL-BASED PRINTING INK AND METHOD FOR PRODUCING SAME," now abandoned; and which is a continuation of U.S. Ser. No. 08/711,577, filed Sep. 10, 1996, entitled "VEGETABLE OIL-BASED PRINTING INK AND METHOD FOR PRODUCING SAME," now U.S. Pat. No. 5,788,752.

BACKGROUND OF THE INVENTION

1. Field of the Invention

The present invention relates generally to printing inks and, more particularly, but not by way of limitation, to a vegetable oil-based printing ink for lithographic printing presses.

In one aspect, the present invention relates to a method of reclaiming residual vegetable oil-based printing ink from a printing press during the cleaning of a printing press by recovering residual vegetable oil-based printing ink from printing presses and utilizing such recovered residual vegetable oil-based printing ink in the formulation of the vegetable oil-based printing ink.

In another aspect, the present invention relates to a method for polymerizing a vegetable oil component of such vegetable oil-based printing ink.

2. Brief Description of the Prior Art

Printing ink produced in the past has been petroleum-based, typically comprised of 15–20% carbon black as the pigment, 15–25% hydrocarbon or alkyd resin, and 50–70% mineral oil solvent. Nearly 500 million kilograms of inks for these applications are produced domestically each year. This volume of production represents a substantial consumption of petroleum-based ingredients. The petroleum oil shortage in the mid-1970's stimulated research to find alternatives to mineral oil and other petroleum products in ink formulations.

In the early 1980's, the American Newspaper Publishers Association ("ANPA") directed a research effort on developing a non-petroleum-based vehicle for newspaper inks. In response to the ANPA directives, numerous approaches were taken resulting in the formulation of vegetable oil-based ink using a combination of petroleum based ingredients and soy bean oil. Widespread commercial acceptance of the petroleum based/soy bean oil ink has been inhibited, however, by the cost, which is 50–70% more than traditional petroleum-based black inks. Additionally, although these inks tout the 100% soy bean oil ingredient, petroleum derivatives are still added to the formulation of the ink to achieve certain characteristic standards.

Despite these advances made by the ANPA and others, the industry has continued to seek a non-petroleum-based printing ink which would "(1) be cost competitive with petroleum-based inks; (2) not require any petroleum-derived component; (3) resist ruboff on hands and clothing; and (4) enable formulation over a wide range of viscosities required by various printing applications.

In 1991, U.S. Pat. No. 5,122,188 was granted wherein Nitrogen was employed to produce a 100% vegetable oil-based printing ink with no petroleum derivatives. Problems have been encountered in employing the non-petroleum derivatives when scaling up for commercialization of the process. The problems that persist in the use of vegetable oil-based inks for lithographic printing presses include lengthy drying time, environmental waste concerns, high production costs, difficulty in clean up, and high material costs.

The present invention solves the above problems that exist in prior vegetable oil-based printing inks by providing a vegetable oil-based printing ink system that lowers material and production costs. Additionally, the vegetable oil-based printing ink is recyclable and removable directly from the printing presses for reuse as a component in the formulation of the vegetable oil-based printing ink. A significant benefit in the current invention is the ability to polymerize vegetable oil in the same process to form high quality recyclable vegetable oil-based printing inks having a wide range of viscosities. The vegetable oil-based printing ink eliminates dependance on petroleum products and provides competitive performance characteristics.

SUMMARY OF THE INVENTION

According to the present invention, vegetable oil-based printing inks are provided which can be produced in a wide range of viscosities while lowering costs and recycling ink waste. The vegetable oil-based printing inks of the present invention are produced by admixing colorant with a vegetable-oil based printing ink vehicle (hereinafter "vehicle"). The vehicle comprises a polymerized vegetable oil and may comprise an unpolymerized vegetable oil produced by admixing from about 5 to about 100 weight percent of polymerized vegetable oil and from 0 to about 95 weight percent unpolymerized vegetable oil sufficient to achieve a viscosity of at least 20 poises.

The vegetable oil-based printing ink may be reclaimed directly from the printing press by applying unpolymerized vegetable oil to the printing press to dissolve residual vegetable oil-based printing ink thereby removing the residual vegetable oil-based printing ink from the printing press and forming a contaminated printing ink. The contaminated printing ink is filtered to remove particulate matter thereby yielding a substantially particulate free residual printing ink. The substantially particulate free residual printing ink is then admixed with an effective amount of colorant and an effective amount of fresh vegetable oil based printing ink vehicle to provide a vegetable oil-based printing ink with at least about 20 poises and a predetermined color.

The polymerized vegetable oil having a viscosity of at least about 20 poises employed in the vegetable oil-based ink vehicle is produced by polymerizing vegetable oil in an evacuated steady state or continuous flow reactor system. More specifically, polymerization of the unpolymerized vegetable oil is achieved by heating unpolymerized vegetable oil under vacuum, to a temperature of from about 150 to about 210 degrees C. for a period of time effective to provide a substantially oxygen free unpolymerized vegetable oil. The substantially oxygen free unpolymerized vegetable oil is then heated under vacuum to a temperature of from about 280 to about 330 degrees C. for a period of time effective to provide a substantially colorless polymerized vegetable oil having a viscosity of at least about 20 poises.

An object of the present invention is to provide vegetable oil-based printing inks having a viscosity of at least 20 poises adaptable for use with a wide variety of printing presses.

Another object of the invention, while achieving the before-stated objective, is to provide a method of reclaiming residual vegetable oil-based printing ink from printing presses.

Yet another object of the present invention, while achieving the before-stated objectives, is to provide a method of cleaning a printing press wherein the waste cleaning solution is biodegradable and thereby substantially reduces the environmental impact of disposal of the waste.

Another object of the invention, while achieving the before-stated objectives, is to provide a method for polymerizing vegetable oil having a wide range of viscosities.

Other objects, advantages, and features of the present invention will become obvious to those skilled in the art upon reading the following detailed description.

DESCRIPTION OF THE PREFERRED EMBODIMENTS

Definitions

Figure 1:
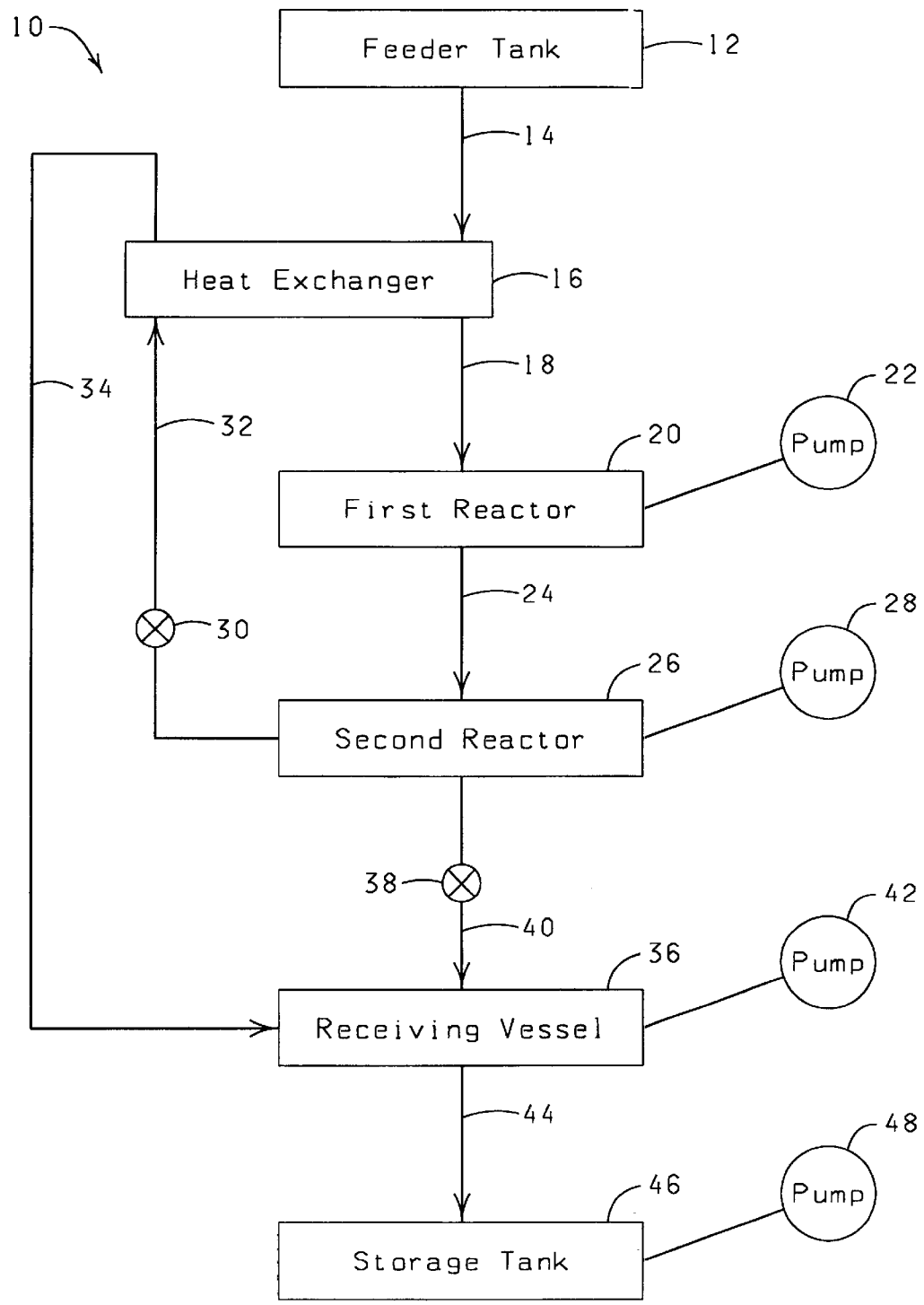
FIG. 1 is a diagrammatic illustration of a system for preparing polymerized vegetable oils in accordance with the present invention.

The term "colorant" as used herein is to be understood to be pigments that provide the vegetable oil-based printing ink with the desired color. The term "colorant" refers to commercially available powdered pigments, dispersions of such pigments including commercially available flushes, and flushes produced from residual vegetable oil-based printing ink removed from printing presses as will be defined and discussed in detail herein after.

The term "vegetable oil-based printing ink vehicle" or "vehicle" as used herein is understood to be a system that carries and dissolves pigment so that it has sufficient flow characteristics to disperse the pigment onto paper. The "vehicle" as used herein comprises an admixture of from 5 to about 100 weight percent polymerized vegetable oil with from 0 to about 95 weight percent unpolymerized vegetable oil sufficient to achieve a vegetable oil-based vehicle having a predetermined viscosity of at least 20 poises. The vegetable oil used in the formulation of the vehicle may be polymerized or unpolymerized vegetable oils such as commercially available soybean oil, cottonseed oil, canola oil, sunflower oil, safflower oil, and mixtures thereof.

The term "printing ink flush" or "flush" as used herein refers to pigment blends utilized in the vegetable oil-based printing ink to render the ink the desired color. The term "flush" means dispersions of pigments including commercially available flushes and flushes produced from residual vegetable oil-based printing ink removed from printing presses as will be defined and discussed in detail herein after. The "flush" may be used as a component in producing a vegetable oil-based printing ink having the desired color and viscosity.

Background

Vegetable oil-based printing inks having a viscosity of at least about 20 poises of the present invention can be formulated by admixing a vehicle with an effective amount of colorant sufficient to provide a vegetable oil-based printing ink having the desired color and viscosity. The amount of vegetable oil-based printing ink vehicle employed in the formulation of the vegetable oil-based printing inks having a viscosity of at least about 20 poises can vary widely and will depend upon the desired viscosity of the vegetable oil-based printing ink, the properties of the colorant and the type of press used for printing using the vegetable oil-based printing inks. Generally, however, the amount of vehicle employed in the formulation of the vegetable oil-based printing ink having a viscosity of at least about 20 poises will be an amount sufficient to provide the vegetable oil-based printing ink with from about 60 to about 95 weight percent of the vehicle.

The vehicle, as stated previously, desirably is an admixture of from about 5 to about 100 weight percent polymerized vegetable oil polymerized vegetable oil and from 0 to about 95 weight percent unpolymerized vegetable oil sufficient to provide the vegetable oil-based printing ink with a viscosity of at least 20 poises. The amount of polymerized and unpolymerized vegetable oil employed in the formulation of the vegetable oil-based printing inks having a viscosity of at least about 20 poises can vary widely and will depend upon the desired viscosity of the vegetable oil-based printing ink, the properties of the colorant and the type of press used for printing using the vegetable oil-based printing inks. Generally, however, the amount of polymerized and unpolymerized vegetable oil employed in the formulation of the vegetable oil-based printing ink having a viscosity of at least about 20 poises will be an amount sufficient to provide the vegetable oil-based printing ink vehicle with from about 5 to about 100 weight percent of the polymerized vegetable oil and from about 0 to about 95 weight percent of the unpolymerized vegetable oil.

Any suitable vegetable oil which is compatible with the colorant and which can be polymerized to provide the vegetable oil constituent having the desired viscosity may be employed as the vegetable oil component of the vegetable oil-based printing inks of the present invention. Examples of such vegetable oils are soybean oil, cottonseed oil, canola oil, sunflower oil, safflower oil, and mixtures thereof. Desired results can been achieved wherein the vegetable oil utilized is a commercially available soybean oil.

The amount of colorant employed in the vegetable oil-based printing inks having a viscosity of at least about 20 poises is that amount necessary to render the vegetable oil-based printing ink with the desired color. Further, the amount of colorant employed will vary depending upon the color of the pigment in the colorant and the desired drying time of the vegetable oil-based ink because it has been found that the amount and state of the colorant present in vegetable oil-based printing inks has an effect on the drying time of the vegetable oil-based printing inks. That is, the more colorant present in the vegetable oil-base printing inks, the less time required to dry such inks. Generally, however, the amount of colorant admixed with the polymerized vegetable oil to produce the vegetable oil-based printing inks will be an amount sufficient to provide the vegetable oil-based inks with from about 5 to about 40 weight percent colorant.

Any suitable colorant containing a pigment capable of imparting the desired color and printing characteristics to the vegetable oil-based inks of the present invention can be employed in the formulation of such inks. For example, the colorant may consist of a powdered pigment, a pigment dispersion, a commercially available ink flush comprising premixed vegetable oil and pigment or flushes prepared by employing reclaimed residual vegetable oil-based printing ink removed from printing presses as will be discussed in detail hereinafter. Desired results can been obtained wherein the colorant is a red pigment, blue pigment, yellow pigment, black pigment, and combinations thereof. It should be understood that the colorant may be combined to achieve other desired colors. Examples of commercially available colorant which can be used from commercially available ink flushes are Lithol Rubine Bio-Set Flush®, Diarylide Yellow AAA S/O Bio-Set Flush®, and Copper Phthalocyanine Blue G/S Bio-Set Flush®. Desired results can also been obtained where the colorant is a pigment selected from newspaper pigments specified by the News Paper Association of America such as Ciba-Geigy Irgalite Blue LGLD.

The vegetable oil-based printing ink can further comprise an effective amount of additives and other auxiliary components, for example resins, plasticizers, stabilizers, drying agents, and others known to the art to improve the quality of the ink. When utilizing additive(s), the formulation of the vegetable oil-based printing ink contains from about 50 to about 95 weight percent vegetable oil-based printing ink vehicle, from about 5 to about 40 weight percent colorant and 0 to about 10 weight percent additives, the vegetable oil based printing ink vehicle comprising from about 5 to about 100 weight percent polymerized vegetable oil and from 0 to about 95 weight percent unpolymerized vegetable oil. Any suitable additive capable of imparting the desired characteristics for printing ink that is compatible with the vegetable oil-based inks of the present invention can be employed in the formulation of such inks. Various additives used in printing inks and in particular lithographic ink compositions are well known in the art as disclosed for example in *The Printing Ink Manual,* Fifth Edition, edited by R. H. Leach, R. J. Pierce, etc., and published by Glue Print, the substance of which is incorporated herein by reference.

The vegetable oil-based printing ink can further comprise an effective amount of preservative compatible with the microbial growth in the vegetable oil-based printing ink. When employing a preservative in the formulation of the vegetable oil-based printing ink, the formulation of the vegetable oil-based printing ink contains from about 59 to about 95 weight percent of the vegetable oil-based printing ink vehicle, from about 5 to about 40 weight percent colorant and 0 to about 1 weight percent preservative, the vegetable oil-based printing ink vehicle comprising from about 5 to about 100 weight percent polymerized vegetable oil and from 0 to about 95 weight percent unpolymerized vegetable oil. Any suitable preservative compatible with the microbial growth of the vegetable oil based printing ink and otherwise compatible with the vegetable oil-based printing ink of the present invention can be employed in the formulation of such inks. Desired results may be obtained wherein the preservative is Zertiary Butyl Hydroxy Quinone. When employing a preservative and additives in the formulation of the vegetable oil-based printing ink, the formulation of the vegetable oil-based printing ink contains from about 49 to about 95 weight percent of the vegetable oil-based printing ink vehicle, from about 5 to about 40 weight percent colorant, from 0 to about 10 weight percent additives, and 0 to about 1 weight percent preservative, the vegetable oil-based printing ink vehicle comprising from about 5 to about 100 weight percent polymerized vegetable oil and from 0 to about 95 weight percent unpolymerized vegetable oil.

If desired, one can incorporate a catalytic amount of a catalyst compatible with the vegetable oil-based printing ink and capable of enhancing polymerization. Any suitable catalyst capable of imparting the desired characteristics for printing ink that is compatible with the vegetable oil-based inks of the present invention can be employed in the formulation of such inks. Such catalysts are well known in the art so no further description of such catalysts are believed necessary.

When employing residual vegetable oil-based printing ink in the formulation of the vegetable oil-based printing inks of the present invention, at least a portion of the vegetable oil-based printing ink may be provided from printing ink removed directly from a printing press (i.e. residual vegetable oil-based printing ink) thereby enhancing the environmental benefits derived from the vegetable oil-based printing inks of the present invention. That is, the composition of the vegetable oil-based printing inks provide for easy removal of the residual vegetable oil-based printing ink from printing presses by using unpolymerized vegetable oil thus eliminating the need to alter the composition of the ink to enhance solubility.

To recover residual vegetable oil-based printing ink, which can be employed in the formulation of a vegetable oil-based printing ink, from a printing press, the press is washed with unpolymerized vegetable oil to dissolve residual vegetable oil-based printing ink in the printing press. The unpolymerized vegetable oil, desirably comprising the unpolymerized vegetable oil component of the vegetable oil-based printing ink, dissolves the residual vegetable oil-based printing ink and produces a contaminated printing ink containing unpolymerized vegetable oil, residual vegetable oil-based printing ink, and particulate matter. The contaminated printing ink is then collected and filtered using a separation process so as to produce a substantially particulate free residual printing ink.

The substantially particulate free residual printing ink may then be used as a component in the formulation of the vegetable oil-based printing ink of the present invention. The substantially particulate free residual printing ink comprises vehicle and colorant as required in the formulation of the vegetable oil-based printing ink. The removal process, however, typically dilutes the amount of colorant in the substantially particulate free residual printing ink. To reclaim the substantially particulate free residual printing ink and obtain a vegetable oil-based printing ink, the substantially particulate free residual printing ink is admixed with an effective amount of colorant and vehicle to formulate a vegetable oil-based printing ink having a viscosity of at least 20 poises and a predetermined color. The amount of colorant and/or vehicle admixed with the substantially particulate free residual printing ink can vary widely and will depend upon the desired viscosity of the vegetable oil-based printing ink. Generally, however, the amount of colorant and/or vehicle admixed with the substantially particulate free residual printing ink employed in the formulation of the vegetable oil-based printing ink will be an amount sufficient to provide the vegetable oil-based printing ink with a viscosity of at least 20 poises, from about 5 to about 40 weight percent of colorant, and from about 60 to 95 weight percent vehicle.

Because the printing ink can be removed directly from the printing press using unpolymerized vegetable oil, and because the vegetable oil-based printing ink can be produced by using residual vegetable oil-based printing ink recovered from the press, the residual vegetable oil-based printing ink can be collected and recycled, thereby enhancing environmental benefits.

The method of reclaiming residual vegetable oil-based printing ink may also be used to produce a flush. Once the substantially particulate free residual vegetable oil-based printing ink is collected, it may be admixed with an effective amount of colorant and an effective amount of vehicle to produce a printing ink flush. Typically the concentration of colorant present in the printing ink flush is of a much higher concentration than the amount of colorant present in the vegetable oil-based printing ink. Additionally, printing ink flush does not require, but does permit the use of polymerized vegetable oil in the formulation.

Once the residual vegetable oil-based printing ink is removed from the printing press, the printing press is washed with a biodegradable cleaning composition. The biodegradable cleaning solution is introduced to the printing press to remove residual unpolymerized vegetable oil and recover a biodegradable waste cleaning solution comprising the biodegradable cleaning solution, residual unpolymerized vegetable oil, and particulate matter. The biodegradable waste cleaning solution is disposable in a public sewer system. Desired results can been obtained where residual vegetable oil-based printing ink is gathered from a Web Off-Set printing press by the above mentioned method using a biodegradable cleaning fluid comprising an admixture of an effective amount of Dowanol Dipropylene Glycol Methyl Ether (DPM), an effective amount of nonionic surfactant such as commercially available X-100®, and an effective amount of deodorant sufficient to remove residual vegetable oil-based printing ink from the printing press. Desired results can be obtained wherein the formulation comprises 89.06 weight percent Dowanol DPM, 10.03 weight percent X-100, and 0.91 weight percent lemon scent. The biodegradable waste cleaning solution can also be a formulation comprising an admixture of an effective amount of Dowanol DPM, an effective amount of nonionic surfactant such as commercially available X-100®, an effective amount of nonionic surfactant such as Witconate 90k flakes, and an effective amount of water sufficient to remove residual vegetable oil-based printing ink from the printing press. Desired results can be obtained wherein the formulation comprises 6.0 weight percent DPM, 7.0 weight percent X-100, 4.2 weight percent Witconate 90k flakes, and 82.80 weight percent water.

Referring now to the drawings, and more particularly to FIGURE, an evacuated continuous flow reactor system 10 for polymerizing vegetable oil in accordance with the present invention is diagrammatically illustrated. The evacuated continuous flow reactor 10 produces polymerized vegetable oils having a wide range of viscosities for use in vegetable oil-based printing inks. The polymerization process is able to yield a range of viscosities of from at least about 20 poises all the way up to the gel state. Further, the vegetable oil-based printing inks formed from the polymerized vegetable oils eliminate petroleum additives and waste by-products. The continuous flow reactor system 10 provides a continuous production system which is a cost effective and efficient means for producing polymerized vegetable oil.

The evacuated continuous flow reactor 10 comprises a feeder tank 12 containing unpolymerized vegetable oil, a heat exchanger 16, a first reactor 20, a second reactor 26, and a receiving vessel 36. The evacuated continuous flow reactor 10 further comprises evacuation pumps 22, 28, 42, and 48, and storage tank 46. When the evacuated continuous flow reactor 10 is in production mode and evacuation pumps 22, 28, 42, and 48 are turned on, the unpolymerized vegetable oil continuously passes from the feeder tank 12 through a conduit 14 into the heat exchanger 16 and polymerized oil continuously passes through the evacuated continuous flow reactor 10 until it reaches the storage tank 46. The pressure differential between the evacuation pumps 22, 28, 42, and 48 acts to force the vegetable oil through the evacuated continuous flow reactor system 10 as the pumps place a vacuum on the vegetable oil to remove oxygen. The unpolymerized vegetable oil is heated in the heat exchanger 16 by heat exchange contact with the polymerized vegetable oil as it simultaneously passes through the heat exchanger 16 in a manner which will be described further. The unpolymerized vegetable oil is heated in the heat exchanger 16 to a temperature of from about 80 to about 100 degrees C. The unpolymerized vegetable oil passes from the heat exchanger 16 through conduit 18 to the first reactor 20 wherein the unpolymerized vegetable oil is heated and stirred under vacuum to a temperature of from about 150 to about 210 degrees C., and more desirable from about 160 to about 180 degrees C. The unpolymerized vegetable oil is heated and stirred under vacuum in the first reactor 20 for a period of time sufficient to permit evacuation pump 22 to substantially remove the oxygen from the unpolymerized vegetable oil. The time that the unpolymerized vegetable oil remains in the first reactor is determined by the volume and the flow rate. Generally, the unpolymerized vegetable oil remains in the first reactor 20 for a resident time of from about one to about three hours.

Next, the unpolymerized vegetable oil passes from the first reactor 20 through conduit 24 into the second reactor 26. The unpolymerized vegetable oil is heated in the second reactor 26 to a temperature of from about 280 to about 330 degrees C. for a period of time effective to polymerize the unpolymerized vegetable oil, more desirable from about 300 to about 320 degrees C. The unpolymerized vegetable oil is heated and stirred under vacuum so that a substantially oxygen free polymerized vegetable oil is provided in the second reactor 26. The time that the unpolymerized vegetable oil remains in the second reactor is determined by the volume and the flow rate sufficient to attain the desired viscosity. Generally, the unpolymerized vegetable oil remains in the second reactor 26 for a resident time of from about 1 to about 3 hours. As the unpolymerized vegetable oil is being heated and stirred to form the polymerized vegetable oil in the second reactor 26, evacuation pump 28 applies a vacuum to the unpolymerized vegetable oil to further remove any remaining entrained oxygen. The unpolymerized vegetable oil is transformed into polymerized vegetable oil and, when valve 30 is opened, at least a portion of the polymerized vegetable oil is passed from the second reactor 26 through conduit 32 to the heat exchanger 16 and the remainder passes direction from the second reactor through conduit 40 to the receiving vessel 36. The polymerized vegetable oil is cooled in the heat exchanger 16 by heat exchange contact with the unpolymerized vegetable oil simultaneously passing through the heat exchanger 16. The polymerized vegetable oil is cooled to a temperature less than about 280 degrees C. The polymerized vegetable oil then passes from the heat exchanger 16 through conduit 34 to the receiving vessel 36.

When valves 30 and 38 are both opened, a portion of polymerized vegetable oil passes from the second reactor 26 through conduit 32 to the heat exchanger 16 and a portion of the polymerized vegetable oil passes directly from the second reactor 26 through conduit 40 to the receiving vessel 36 without passing through heat exchanger 16. It should be noted that when valve 38 is opened and valve 30 is closed, the polymerized vegetable oil passes directly from the second reactor 26 through conduit 40 to the receiving vessel 36 without passing through heat exchanger 16.

The polymerized vegetable oil remains in the receiving vessel 36, under vacuum from pump 42, and the viscosity is measured. After the desired viscosity is attained, the polymerized vegetable oil passes from the receiving vessel 36 through conduit 44 and is then collected in the storage tank 46. Pump 48 applies a vacuum to the polymerized vegetable oil in the storage tank 46.

It should be understood that polymerization of the vegetable oil may also be achieved using a batch process wherein the substantially oxygen free polymerized vegetable oil having a viscosity of at least about 20 poises is produced by heating unpolymerized vegetable oil under vacuum to a predetermined temperature for a period of time effective to remove entrained oxygen from the unpolymerized vegetable oil and produce a substantially oxygen free unpolymerized vegetable oil. The unpolymerized vegetable oil is heated and stirred under vacuum to a temperature of from about 280 to about 330 degrees C. for a period of time effective to remove entrained oxygen and to produce a polymerized vegetable oil having a viscosity of at least about 20 poises. Longer periods of time may be required wherein a larger amount of vegetable oil is being polymerized and higher viscosities are desired.

As previously stated, the vegetable oil-based printing ink having a viscosity of at least about 20 poises comprises the above mentioned vehicle and an effective amount of colorant sufficient to provide the vegetable oil-based printing ink with the desired color.

In order to more fully describe the present invention, the following examples are set forth. However, it is to be understood that the examples are for illustrative purposes only and are not to be construed as unduly limiting the scope of the present invention.

EXAMPLE 1

A vegetable oil-based printing ink having a viscosity of from about 235 to about 245 poises may be prepared by admixing the following ingredients:
- 15 weight percent Ciba-Geigy Irgalite Blue LGLD colorant and
- 85 weight percent vehicle having a viscosity of about 250 poises comprising:
  - 80 weight percent polymerized soybean oil having a viscosity of about 1247 poises
  - 20 weight percent unpolymerized soybean oil The polymerized vegetable oil having at least 20 poises and more preferably about 1247 poises may be produced by the following procedure:

Two liters of unpolymerized soybean oil may be placed in a 5 liter round bottom flask under vacuum of 26 inches of mercury. The unpolymerized soybean oil may then be heated for approximately two hours until a steady temperature of 305 degrees C. is reached. The temperature may then be maintained at 305 C. for from about 4 to about 5 hours until polymerization of the unpolymerized soybean oil is achieved. The polymerized soybean oil may then be cooled and the viscosity measured with a Brookfield viscometer at about 25 C. A viscosity of from about 1200 to about 1250 poises may then be obtained.

EXAMPLE 2

A vegetable oil-based printing ink may be prepared by admixing the following ingredients:
- 87.51 weight percent Vehicle comprising:
  - 65.63 weight percent Polymerized Soybean Oil
  - 21.88 weight percent Unpolymerized Soybean Oil
- 12.50 weight percent Copper Phthalocyanine Blue GIS Bio-Set flush®

The vegetable oil-based printing ink may then be applied to a sheet of paper thereby exhibiting good color definition.

EXAMPLE 3

A vegetable oil-based printing ink may be prepared by mixing the following ingredients:
- 81.33 weight percent Vehicle comprising:
  - 50.64 weight percent Polymerized Soybean Oil
  - 30.69 weight percent Unpolymerized Soybean Oil
- 18.67 weight percent Lithol Rubine Bio-Set Flush®

The vegetable oil-based printing ink may then be applied to a sheet of paper thereby exhibiting good color definition.

EXAMPLE 4

Printing ink may be reclaimed from a Web Off-Set printing press according to the following procedure:

1. Clean the blanket roller by applying unpolymerized soybean oil to a blanket roller of the press and wipe the roller clean using a sponge or roller. Residual soybean oil is removed from the blanket roller by wiping the roller with a dry rag.
2. Clean the ink rollers by removing unused printing ink before cleaning the press. Pour unpolymerized soybean oil onto the roller while the rollers are rotating at a slow speed. The unpolymerized oil is added until all the ink has been removed. The waste ink is then removed from the ink container and stored in a can for recycling.
3. The ink collected by the above process is collected and filtered through a coarse filter using a suction funnel to remove particulate matter. The concentration of pigment contained in the filtered waste ink may be determined by using a draw-down strip. The concentration of the waste ink is then adjusted to achieve the desired weight percent of colorant by adding colorant to the waste ink. The waste ink may be homogenized for about 10 minutes to obtain a reading of less than 4 on a grind gauge. The desired weight percent of colorant in the waste ink is from about 5 to about 40 weight percent colorant.

EXAMPLE 5

The following procedure may be used for polymerizing soybean oil in the evacuated continuous flow reactor system (FIG. 1). The evacuated continuous flow reactor is placed in production mode according to the following starting conditions:

Feeder Vessel—1000 ml unpolymerized soybean oil

1st Reactor Vessel—1500 ml unpolymerized soybean oil

2nd Reactor Vessel—3000 ml unpolymerized soybean oil

Receiving Vessel—200 ml unpolymerized soybean oil

P1—1st Reactor evacuation pump pressure 25 in.

P2—2nd Reactor evacuation pump pressure 25.5 in.

P3—Receiving Vessel evacuation pump pressure 25 in.

P4—Storage Tank evacuation pump pressure 0 in.

Flow—Initial Flow Rate—0 ml/min.

The evacuation pumps are pressurized and the second reactor is preheated to a temperature of about 303 degrees C. to begin the flow of the soybean oil through the evacuated continuous flow reactor system. Once the temperature of 303 degrees C. in the second reactor is achieved and the pumps are turned on, then the unpolymerized soybean oil will begin to flow. The soybean oil may flow through the evacuated continuous flow reactor system according to the following conditions:

| | | Evacuation Pumps | | | | | |
|---|---|---|---|---|---|---|---|
| Reaction Time (min) | Flow Rate ml/min | P1 in | P2 in | P3 in | P4 in | 2nd Reactor Temp (C.) | Viscosity Poises |
| 0 | 0 | 20 | 21.5 | 26.5 | 28 | 303 | 16 |
| 60 | 10 | 13 | 15 | 21.5 | 28 | 310–318 | 16.01 |
| 100 | 16 | 15 | 19 | 21 | 28 | 310–318 | 17.4 |
| 157 | 8 | 15 | 19 | 21 | 28 | 310–318 | 21.9 |
| 288 | 5 | 15 | 19 | 21 | 28 | 310–318 | 39.1 |

The second reactor is heated and stirred to a temperature of from about 310 to about 318 degrees C. to begin polymerization of the soybean oil. As the soybean oil is heated, evacuation pumps 1–4 remove oxygen from the soybean oil thereby providing a substantially oxygen free polymerized soybean oil. As the soybean oil is polymerized, the viscosity of the soybean oil increases. At each of the time intervals above, 500 ml of the polymerized soybean oil is collected and the viscosity measured on a Brookfield viscometer. The flow rate may also be determined by the time it takes for 500 ml to pass from the receiving vessel to the storage tank. As shown in the table above, a reaction time of 288 minutes at the given flow rates, pressures, and temperatures through the evacuated continuous flow reactor system yields a polymerized soybean oil having a viscosity of 39.1 poises. It should be understood that the pressures indicated in the above table may vary from about 3 to about 7 inches during the polymerization process.

Changes may be made in the construction and the operation of the various components, elements and assemblies described herein and changes may be made in the steps or the sequence of steps of the methods described herein without departing from the spirit and scope of the invention as defined in the following claims.

What is claimed:

1. A method of reclaiming residual vegetable oil-based printing ink from a printing press during the cleaning of a printing press, comprising:

a. applying unpolymerized vegetable oil to a printing press in an amount effective to dissolve residual vegetable oil-based printing ink therefrom thereby producing a contaminated printing ink comprising unpolymerized vegetable oil, residual vegetable oil-based printing ink and particulate matter;

b. filtering the contaminated printing ink to remove particulate matter and provide a substantially particulate free residual printing ink;

c. admixing an effective amount of colorant with an effective amount of substantially particulate free residual printing ink to provide a residual vegetable oil-based printing ink having a predetermined viscosity and a predetermined weight percent of colorant; and d. disposing of the biodegradable waste cleaning solution in a public sewer system.

* * * * *